United States Patent
Kuckens et al.

[15] 3,669,312
[45] June 13, 1972

[54] CONTROL ARRANGEMENT FOR FLUID DISPENSERS

[72] Inventors: Alexander Kuckens, Bellevue 20, 2 Hamburg 39; Wolfgang Niehaus, Sandheide 15, 2104 Hamburg-Neugraben, both of Germany

[22] Filed: Dec. 8, 1969

[21] Appl. No.: 883,094

[30] Foreign Application Priority Data

Dec. 7, 1968 Germany............P 18 13 318.1

[52] U.S. Cl............................................222/70, 307/141
[51] Int. Cl.....................................................G01f 15/02
[58] Field of Search...........................222/70; 317/139, 140; 137/625.11; 307/141

[56] References Cited

UNITED STATES PATENTS

| | | | |
|---|---|---|---|
| 2,682,984 | 7/1954 | Melikian | 222/70 X |
| 2,830,142 | 4/1958 | Smith | 222/70 X |
| 2,851,189 | 9/1958 | Lux | 222/70 X |
| 2,855,476 | 10/1958 | Garrard | 222/70 X |
| 3,055,552 | 9/1962 | Emmons | 222/70 |
| 3,320,431 | 5/1967 | Bough | 307/141.4 X |

Primary Examiner—Robert B. Reeves
Assistant Examiner—Thomas E. Kocovsky
Attorney—Michael S. Striker

[57] ABSTRACT

Fluid flow taking place from a dispenser and is blocked or released by an electromagnet. The release is effective by a start signal such as a dropped coin or a pushed button. The flow of fluid continues for a time determined by a timing circuit. The timing circuit has a counter which counts the number of start signals by causing counting stages to become energized in dependence of the number of start signals received. Energization of the different counting stages causes a variation in the current supplied to a resistance-capacitance timing circuit, thus varying the timing of the timing circuit to allow the same quantity of fluid to flow for each individual portion dispensed, regardless of the static pressure of the fluid remaining in the dispenser.

11 Claims, 3 Drawing Figures

PATENTED JUN 13 1972 3,669,312

Inventor:
ALEXANDER KUCKENS
WOLFGANG NIEHAUS

By Michael S. Stiker
Attorney

CONTROL ARRANGEMENT FOR FLUID DISPENSERS

BACKGROUND OF THE INVENTION

This invention relates to fluid dispensers dispensing individual portions of the fluid contained therein in response to a start signal, as for example a dropping of a coin or the pushing of a button. Three types of systems are known for controlling the individual portions so dispensed, namely volumetric measurement, gravimetric measurement, and measurement of the opening time of the element controlling the fluid flow from the dispenser.

Since an element for controlling the flow from the dispenser must be present in any case, the systems using volumetric and gravimetric measurement require additional equipment. Furthermore, these two types of measurement cause hygenic programs, when the liquid to be dispensed is biologically sensitive, as for example, in the case of milk. Of course in this case, equipment which may physically be in touch with the sensitive fluid, must be maintained in a clean state.

Thus it becomes obvious that controlling the amount of fluid dispensed per individual portion in accordance with the opening time of an element controlling the flow of fluid from the dispenser is particularly advantageous, because the control circuit for the element need not come in contact with the fluid. However, other difficulties arise. For example, the fluid in these dispensers flows because of the static pressure associated with it. Thus the time during which each individual portion is dispensed must be lengthened as the static pressure decreases because of the increasing lower fluid levels. Of course it is possible to regulate the time of flow for each individual portion in accordance with an average pressure corresponding to a half-filled dispenser. However, in this case, depending upon the total pressure variation from full to empty, a very substantial plus and minus tolerance may exist. Some known control arrangements exist which decrease these tolerances by changing the timing in stages. However, these systems also result in relatively large tolerances.

Furthermore, dispensers are known wherein the static pressure of the fluid at the exit point from the dispenser is regulated by use of a stiff container which is rigidly sealed to separate the surface of the fluid from the outer atmosphere. If air is now admitted to such a dispenser at the bottom of said dispenser, then the amount of fluid leaving the dispenser is controlled by the incoming volume of gas and the static pressure of the fluid column does not affect the amount of fluid being dispensed.

This type of arrangement is very advantageous compared to the control arrangements using volumetric or gravimetric measurement. However, the equipment which furnishes the air to be injected into the dispenser must also be cleaned. Thus these arrangements also pose some hygenic problems. Furthermore, these arrangements have the disadvantage that the walls of the dispenser must be extremely strong, in order to resist the vacuum which forms over the surface of the liquid. Of course any tendency of the walls of the dispenser to collapse would cause changes in the vacuum being formed and would change the amount of fluid dispensed. For example, if the dispenser is made of a synthetic material as for example some kind of elastic container, no compensation would result, since the volume of the container changes with decreasing fluid content.

It would be possible to devise an electromechanical control system with electrically activated switching elements, which cause the time interval for the dispensing of the fluid to increase slightly from one stage to another. This requires a relatively large amount of equipment.

Electronically, a control arrangement could be devised in which the timing for each individual portion to be dispensed is represented by a different RC network. This requires a relatively large number of electronic components. For both this and the previously-described case, it is difficult to regulate each portion individually. This may result in such a large problem in practice, that such a solution is simply not usable. If, for example, 150 ccm. portions are to be dispensed from a container holding 10 liters, then at least 64 different time intervals must be provided in order to empty the container and to maintain equal individual portions throughout. Thus, a large amount of equipment would be required.

SUMMARY OF THE INVENTION

It is an object of the invention to furnish an arrangement for controlling the flow of fluid from a fluid dispenser, which does not have the above-mentioned drawbacks and wherein substantially equal amounts of fluid may be dispensed independent of the static pressure of the fluid remaining in the dispenser.

It is a further object of the invention to furnish such an arrangement without creating problems of hygiene.

It is a further object of the invention that the dispensers used may be constructed of any desirable material and may, for example, be disposable dispensers made from soft synthetic material.

This invention comprises a control system for fluid dispensers which allows individual portions to be dispensed which are substantially equal, independent of the static pressure of the fluid remaining in the dispenser.

In accordance with this invention, an electronic timing circuit is provided which furnishes a timing signal to the control circuit of fluid blocking means which are adapted to block the flow of fluid from the dispenser when in a first state and to permit the flow of fluid from the dispenser when in a second state. This timing circuit works by utilization of the charge, discharge or recharging time of a capacitor. The timing circuit operates in conjunction with counting means having a plurality of counting outputs. If for example six counting outputs are provided and the counter counts in accordance with a binary code, 64 different timing intervals may be obtained. Furthermore, the circuit may be so arranged that after the proper amount of fluid has been dispensed, the circuit is automatically adjusted to the next longer time intervals for making the next subsequent dispensation. In a preferred embodiment of the invention, the timing resistance included in the timing circuit means has one terminal connected to the top of a voltage divider whose lower portion comprises six individual resistances, each of which is connected with a counting stage. In this arrangement no decoding is required, since the decrease in voltage at the voltage tap of the voltage divider is divided into 64 separate steps.

If the resistance means constituting the upper part of the voltage divider comprise a variable resistance, then the slope of the control characteristic may be changed proportionally for all operating conditions, as will become obvious from the discussion below.

The time required for dispensing the first portion of the fluid should be the shortest time, since the static pressure is relatively high. The longest time should of course be the time required for dispensing the last individual portion. Thus the output resistors of the counting stages, namely the lower portions of the voltage divider are correspondingly chosen to effect the dispensing time. By a proportional decrease of the voltage at the voltage divider tap, the timing is automatically correct for all intermediate stages. If the supply voltage should decrease, the maximum voltage is still supplied when the dispenser is filled to highest value and the lowest voltage still corresponds to the last portion to be dispensed. This behavior may be used to effect a visual indication of the amount of fluid remaining in the dispenser by connecting a volt meter across the above-described lower part of the voltage divider and allowing the indication of the volt meter to be visible at the outside of the dispenser. This is of course particularly important when the dispenser is opaque and it is impossible otherwise to see the fluid level therein.

It is further possible to supply a battery for furnishing the supply voltage to the timing circuit and the counting means in case of a power failure.

3,669,312

DESCRIPTION OF THE PREFERRED EMBODIMENTS

Figure 1A:
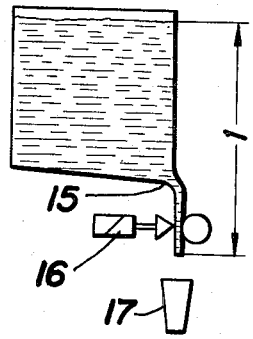
FIG. 1a is a schematic representation of the dispenser with a high fluid level.

The description of the embodiments of this invention will now be discussed in relation to the drawing.

Figure 1B:
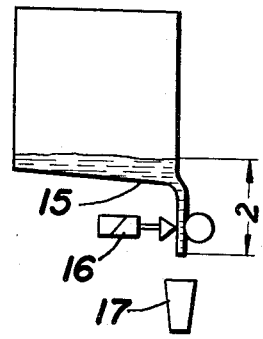
FIG. 1b is a schematic representation of a dispenser which is almost empty.

The Figures show a plastic dispenser containing a fluid as for example milk. As shown in FIG. 1a, the level of the milk originally is a maximum level which is denoted with 1, while, in FIG. 1b, the level of the milk corresponds to an almost empty condition and is denoted by reference numeral 2. In FIG. 1b, the static pressure is of course substantially lower than that indicated in FIG. 1a.

At the bottom edge, the container or dispenser 15 is fitted with a hose-like element through the fluid flows when leaving the dispenser to be dispensed to a vessel 17. This hose-like element must of course be fluid-tight and may for example be made of natural rubber or highly elastic material. This hose is inserted into an electromagnet 16 and is blocked by means of this electromagnet. The electromagnet, one embodiment of fluid blocking means, has a control circuit connected to timing circuit means which have binary coded counting means, and may be activated by the insertion of a coin or the pushing of a button.

Figure 2:
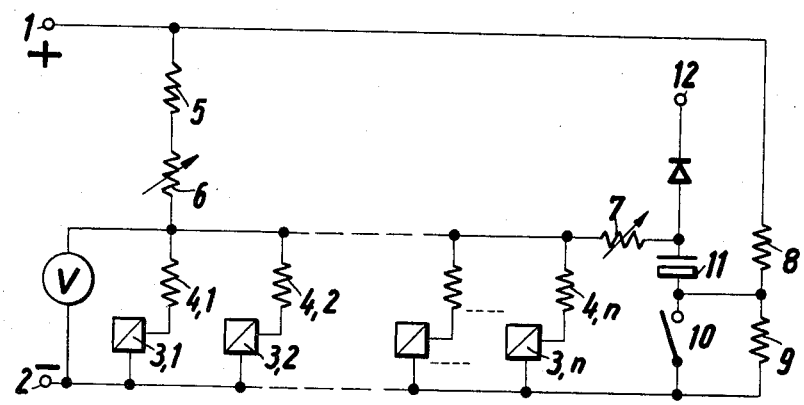
FIG. 2 is a circuit diagram for the timing circuit controlling the flow of fluid from the above dispenser.

The timing circuit means are illustrated in FIG. 2. They have a terminal 1 and a terminal 2, to which is applied a stabilized D.C. voltage. The timing circuit means as shown in FIG. 2 comprise counting means which, in this particular embodiment of binary coded counting means. The binary counting means have a plurality of counting stages, here labeled 3,1; 3,2; . . .3,n. Each of the stages 3,1 through 3,n comprise a bistable stage. The individual bistable stages are series connected to form a binary counter. The output resistance connect to each counting stage, namely resistance 4,1; 4,2; . . .4,n have resistance values related to one another by a binary relationship. The resistances are so connected to the outputs of the binary stages that current flows through these resistances. Terminal 1 is herein referred to as the first voltage terminal, while terminal 2, in FIG. 2, is referred to as the second voltage terminal. A voltage divider is connected from terminal 1 to terminal 2. This voltage divider comprises resistance means, namely fixed resistance 5 and variable resistance 6 which have a first terminal connected to the first voltage terminal, and a second terminal. The second terminal of the resistance means constitutes the voltage tap of the voltage divider. Resistance 7 which has a first terminal connected to the second terminal of the resistance means, constitutes a timing element. The second terminal of the timing element is connected to one terminal of the capacitor 11, which is a timing capacitor. The energie charged to the capacitor 11 is discharged by a current flowing through resistor 7 after switch 10 has been closed. Resistors 8 and 9 are connected in series from terminal 1 to terminal 2 and form a voltage divider at whose tap is connected the other terminal of the capacitor 11. Also connected to the common point of the capacitor 11 and the voltage divider tap is one terminal of switch 10 whose other terminal is connected to the second voltage terminal, or terminal 2. Also connected to the common point of resistance 7 and capacitor 11 is the anode of the diode, whose cathode is connected to a terminal 12. This terminal 12 serves to furnish the current for the time switch, that is, during the time that fluid is being dispensed no current flows at terminal 12. After the energie charged to capacitor 11 is discharged until point zero and starts to charge with inversed polarization the diode 12 is not longer blocked. For purposes of simplicity, the connection of the timing switch has been omitted, as have been the connections between the binary stages, which are well known.

The first count takes place before any binary stage has been energized, that is with the highest voltage at potentiometer 7. Thus, this pulse has relatively the shortest duration. After the first pulse has terminated, the counting stage 3,1 is energized causing the resistance 4,1 to decrease the voltage at the voltage divider tap and thereby the operating voltage for the potentiometer 7 by a corresponding amount. The subsequent time interval, started by switch 10, has a correspondingly longer duration. At the end of the second pulse, binary stage 3,2 is energized, while binary stage 3,1 is extinguished. Now the voltage at the voltage divider tap is decreased by a somewhat greater amount. For a linear decrease, the decrease amounts to twice the amount of the previous decrease. After this time interval has elapsed, the stage 3,1 is re-energized and the voltage at the voltage divider tap decreases again. This process continues until all the counting stages have been utilized in binary combinations, that is, for six counting stages, $2^6 = 64$ steps are possible. It is further possible to feed the voltage at the voltage divider tap to a Schmitt trigger, and to use the output of the Schmitt trigger to indicate that the dispenser is empty when the voltage at the voltage divider tap has decreased below a predetermined value. If the dispenser is not fully filled, the slope of the divider curve may be adjusted for the proper value by means of resistance 6.

It is obvious from the above, that a solid dispenser may be used as well as the elastic fluid container mentioned above and that, instead of blocking a hose-like member by means of an electromagnet, the fluid flow blocking means may be a conventional electromagnetically activated value. How ever, the embodiment illustrated here, using the hose-like elements blocked by means of an electromagnet that no parts of the fluid flow blocking means come in contact with the fluid to be dispensed and therefore a very favorable condition exists with respect to hygiene.

It is further obvious that not only can any container be used, for example it is possible to use elastic foil milk containers or the container may be an oil barrel, but it is also possible with only a slight amount of additional equipment, to control the number of individual portions to be dispensed, thus controlling the total amount of fluid to be dispensed. In order to dispense individual portions, for example 256 units, the binary coded factor of $2^8$ would be selected.

While the invention has been illustrated and described as embodied in a particular fluid blocking means, dispenser, and timing circuit, it is not intended to be limited to the details shown, since various modifications and circuit changes may be made without departing in any way from the spirit of the present invention.

Whithout further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Dispenser control arrangement comprising, in combination, dispensing means; blocking means operatively associated with said dispensing means for starting flow from said dispensing means in response to each of a plurality of external activations and blocking flow from said dispensing means in response to a blocking signal; resistance-capacitance circuit means connected to said blocking means and furnishing said blocking signals a determined time interval following each of said plurality of external activation; and time constant changing means comprising counting circuit means counting each of said plurality of external activation and furnishing resultant count signals corresponding thereto, for automatically changing said determined time interval for each of said plurality of external activations in dependence upon said resultant count signals.

2. Dispenser control arrangement comprising, in combination, dispensing means; blocking means operatively associated with said dispensing means for starting flow from said dispensing means in response to each of a plurality of external activation and blocking flow from said dispensing means in response to a blocking signal; resistance-capacitance circuit means having initial resistance means, connected to said blocking means and furnishing said blocking signal a determined time interval following each of said plurality of external activations; and time constant changing means connected to said resistance-capacitance circuit means for automatically increasing said initial resistance means for each of said plurality of external activations, thereby automatically changing said determined time interval, said time constant changing means comprising counting circuit means counting each of said plurality of external activations and furnishing resultant count signals corresponding thereto, the additional resistance means connected to said resistance-capacitance circuit means in dependence upon said resultant count signals.

3. An arrangement as set forth in claim 2, wherein said counting circuit means comprise a plurality of binary stages; and wherein said additional resistance means comprise a plurality of additional resistors, each connected to one of said binary counting stages.

4. An arrangement as set forth in claim 3, wherein said dispensing means dispense fluid under the static pressure of said fluid; and wherein said additional resistors have resistance values adapted to increase said time interval in correspondence to decreases in said static pressure in such a manner that the quantity of fluid dispensed in response to each of said plurality of external activations remains substantially constant.

5. An arrangement as set forth in claim 4, wherein said resistance-capacitance circuit means comprise a charging capacitor; initial resistance means series connected to said charging capacitor; a voltage source; and switching means responsive to said external activation for connecting said voltage source to said series-connected initial resistance means and charging capacitor.

6. An arrangement as set forth in claim 5, wherein said initial resistance means comprise a first and second resistor connected at a common point; and wherein each of said additional resistors is interconnected between one of said binary counting stages and said common point.

7. An arrangement as set forth in claim 6, wherein said dispenser means is opaque; wherein said voltage source has a first terminal directly connected to said initial resistance means and a second terminal connected to said binary counting stages; further comprising volt meter means connected from said common point to said second terminal for furnishing a visual indication of the quantity of fluid remaining in said dispenser means.

8. An arrangement as set forth in claim 7, wherein said initial resistance means comprise a variable resistor.

9. Dispenser control arrangement comprising, in combination, start signal furnishing means for furnishing start signals; counting circuit means connected to said start signal furnishing means for counting said start signals and furnishing resultant count signals signifying the number of so-counted start signals; timing circuit means connected to said start signal furnishing means and said counting circuit means, said timing circuit means furnishing timing signals in response to said start signals, said timing signals having timed durations corresponding to said resultant count signals; and means blocking flow from said dispenser in the absence of said timing signal and permitting flow from said dispenser during said time durations of said timing signals.

10. A dispenser control arrangement as set forth in claim 9, wherein said timing circuit means comprise a resistance-capacitance circuit having an RC time constant, and means varying said RC time constant as a function of said resultant count signal.

11. A dispenser control arrangement as set forth in claim 10, wherein said counting circuit means comprise a plurality of counting stages selectively energized in response to consecutive start signals to constitute said resultant count signals; and wherein said means varying said RC time constant comprise a plurality of additional resistance means, each connected to one of said counting stages in such a manner that energization of a counting stage connects the corresponding one of said additional resistance means to said resistance-capacitance circuit, thereby increasing said RC time constant.

* * * * *